US010616870B2

(12) United States Patent
Matsumoto et al.

(10) Patent No.: US 10,616,870 B2
(45) Date of Patent: Apr. 7, 2020

(54) USER TERMINAL AND BASE STATION

(71) Applicant: KYOCERA CORPORATION, Kyoto (JP)

(72) Inventors: Naohisa Matsumoto, Higashiomi (JP); Hiroyuki Urabayashi, Yokohama (JP); Kugo Morita, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 5 days.

(21) Appl. No.: 15/810,431

(22) Filed: Nov. 13, 2017

(65) Prior Publication Data

US 2018/0077699 A1 Mar. 15, 2018

Related U.S. Application Data

(63) Continuation of application No. PCT/JP2016/064171, filed on May 12, 2016.

(60) Provisional application No. 62/165,315, filed on May 22, 2015, provisional application No. 62/162,243, filed on May 15, 2015.

(51) Int. Cl.
*H04W 72/04* (2009.01)
*H04W 24/10* (2009.01)
*H04L 1/18* (2006.01)
*H04W 16/14* (2009.01)

(52) U.S. Cl.
CPC ....... *H04W 72/0413* (2013.01); *H04L 1/1812* (2013.01); *H04L 1/1887* (2013.01); *H04W 24/10* (2013.01); *H04W 72/042* (2013.01); *H04W 16/14* (2013.01); *H04W 72/0446* (2013.01)

(58) Field of Classification Search
CPC .......... H04W 72/413; H04W 72/0446; H04W 24/10; H04L 1/1812; H04L 1/1887
See application file for complete search history.

(56) References Cited

U.S. PATENT DOCUMENTS

| 8,649,333 | B2 | 2/2014 | Fukuoka et al. | |
| 9,363,799 | B2* | 6/2016 | Park | H04L 1/0026 |
| 9,826,526 | B2* | 11/2017 | Oizumi | H04W 72/02 |
| 9,924,536 | B2* | 3/2018 | Seo | H04L 5/00 |
| 9,974,058 | B2* | 5/2018 | Maattanen | H04L 5/0037 |
| 10,333,659 | B2* | 6/2019 | Wang | H04L 1/1822 |
| 2011/0149832 | A1* | 6/2011 | Kim | H04W 72/005 370/312 |

(Continued)

FOREIGN PATENT DOCUMENTS

| WO | 2007119452 A1 | 8/2009 |
| WO | 2011/136082 A1 | 11/2011 |
| WO | 2015/042594 A2 | 3/2015 |

OTHER PUBLICATIONS

ETRI; "Discussion on UL grant for LAA"; 3GPP TSG RAN WG1 Meeting #80bis; R1-152095; Apr. 20-24, 2015; total 5 pages; Belgrade, Serbia.

(Continued)

*Primary Examiner* — Rasheed Gidado
(74) *Attorney, Agent, or Firm* — Studebaker & Brackett PC

(57) ABSTRACT

A user terminal according to an embodiment transmits uplink data to a base station using an unlicensed band. The user terminal includes a controller configured to, if uplink data transmission is started from a middle of a subframe according to a monitoring result of the unlicensed band, perform processing of transmitting a specific signal being different from the uplink data, at a beginning of the uplink data.

3 Claims, 15 Drawing Sheets

(56) References Cited

U.S. PATENT DOCUMENTS

| | | | |
|---|---|---|---|
| 2013/0201930 A1 | 8/2013 | Okino et al. | |
| 2015/0201431 A1* | 7/2015 | Um | H04L 5/0048 |
| | | | 370/280 |
| 2015/0296455 A1* | 10/2015 | Yamazaki | H04W 72/042 |
| | | | 370/311 |
| 2015/0349931 A1* | 12/2015 | Damnjanovic | H04L 5/0007 |
| | | | 370/280 |
| 2016/0302231 A1* | 10/2016 | Chien | H04W 74/0816 |
| 2017/0142737 A1* | 5/2017 | Zheng | H04W 16/14 |

OTHER PUBLICATIONS

Intel Corporation; "Uplink transmission with LBT"; 3GPP TSG-RAN WG2 #89bis; R2-151102; Apr. 20-24, 2015; total 6 pages; Bratislava, Slovakia.

Kyocera; "Discontinuous Transmission Design for LAA"; 3GPP TSG RAN WG1 Meeting #81; R1-153102; May 25-29, 2015; total 3 pages; Fukuoka, Japan.

An Office Action issued by the Japanese Patent Office dated Dec. 5, 2017, which corresponds to Japanese Patent Application No. 2017-519167 and is related to U.S. Appl. No. 15/810,431; with English language Concise Explanation.

International Search Report issued in PCT/JP2016/064171; dated Aug. 2, 2016.

NTT Docomo, Inc.; Discussion on issues related to UL transmission in LAA DL; 3GPP TSG RAN WG1 Meeting #80bis; R1-151958; Apr. 20-24, 2015; pp. 1-6; Belgrade, Serbia.

NTT Docomo, Inc.; Discussion on frame structure and LBT mechanism for LAA DL; 3GPP TSG RAN WG1 Meeting #80bis; R1-151957; Apr. 20-24, 2015; pp. 1-7; Belgrade, Serbia.

* cited by examiner

USER TERMINAL AND BASE STATION

RELATED APPLICATION

This application is a continuation application of international application PCT/JP2016/064171, filed May 12, 2016, which claims the benefit of U.S. Provisional Application No. 62/162,243 (filed May 15, 2015) and U.S. Provisional Application No. 62/165,315 (filed May 22, 2015), the entire contents of which are incorporated herein by reference.

TECHNICAL FIELD

The present disclosure relates to a user terminal and a base station that are used in a mobile communication system.

BACKGROUND ART

In the 3rd Generation Partnership Project (3GPP), which is a mobile communication system standardization project, approaches for sophisticating Long Term Evolution (LTE) are promoted for keeping up with rapidly-increasing traffic demand. As one of such approaches, it is considered that not only a frequency band in which a license is granted to an operator (licensed band), but also a frequency band not requiring a license (unlicensed band) is used for LTE communication.

In the unlicensed band, a listen-before-talk (LBT) procedure is required for avoiding interference with another system (wireless local area network (LAN), etc.) being different from an LTE system, or with an LTE system of another operator. The LBT procedure is a procedure of monitoring a frequency in an unlicensed band, and thereby checking whether the frequency is vacant, based on reception power (interference power), and using the frequency only if it is checked that the frequency is vacant (clear channel).

SUMMARY

A user terminal according to an embodiment transmits uplink data to a base station using an unlicensed band. The user terminal includes a controller configured to, if uplink data transmission is started from a middle of a subframe according to a monitoring result of the unlicensed band, perform processing of transmitting a specific signal being different from the uplink data, at a beginning of the uplink data.

A user terminal according to an embodiment transmits uplink data to a base station using an unlicensed band. The user terminal includes a controller configured to select, according to a monitoring result of the unlicensed band, one of a plurality of candidate timings configured in one subframe, and to start transmission of the uplink data at the selected candidate timing.

A base station according to an embodiment performs communication with a user terminal configured to transmit uplink data using an unlicensed band. The base station includes a controller configured to, if the user terminal performs uplink data transmission across a subframe boundary according to a monitoring result of the unlicensed band, consecutively allocate a same frequency resource in the unlicensed band to the user terminal for a certain period of time. The subframe boundary is a boundary between two consecutive subframes.

A base station according to an embodiment performs communication with a user terminal configured to transmit uplink data using an unlicensed band. The base station includes a controller configured to, if the user terminal performs uplink data transmission across a subframe boundary according to a monitoring result of the unlicensed band, allocate a plurality of consecutive subframes to the user terminal. The subframe boundary is a boundary between two consecutive subframes.

A base station according to an embodiment performs communication with a user terminal configured to transmit uplink data using an unlicensed band. The base station includes a controller configured to, if allocating a frequency resource included in the unlicensed band, to a first user terminal, and then, allocating the frequency resource to a second user terminal, allocate the frequency resource to the second user terminal after a certain time interval from an end of an allocation period with respect to the first user terminal.

A user terminal according to an embodiment transmits uplink data to a base station using an unlicensed band. The user terminal includes a controller configured to, if it is determined, based on a monitoring result of the unlicensed band, that transmission of uplink data can be started, perform processing of transmitting a notice related to a start of uplink data transmission, to another user terminal.

A user terminal according to an embodiment transmits uplink data to a base station using an unlicensed band. The user terminal includes: a receiver configured to receive a notice related to a start of transmission of the uplink data, from another user terminal that has determined, based on a monitoring result of the unlicensed band, that transmission of uplink data can be started; and a controller configured to perform, based on the notice, control of synchronizing a timing at which transmission of uplink data is to be started in the user terminal, with a timing at which transmission of uplink data is to be started in the another user terminal.

A base station according to a sixth embodiment receives uplink data from a user terminal using an unlicensed band. The base station includes: a receiver configured to receive a notice related to a start of transmission of the uplink data, from the user terminal that has determined, based on a monitoring result of the unlicensed band, that transmission of the uplink data by the user terminal can be started; and a controller configured to determine, based on the notice, a start timing of transmission of the uplink data.

DESCRIPTION OF EMBODIMENTS

Overview of Embodiments

Figure 1:
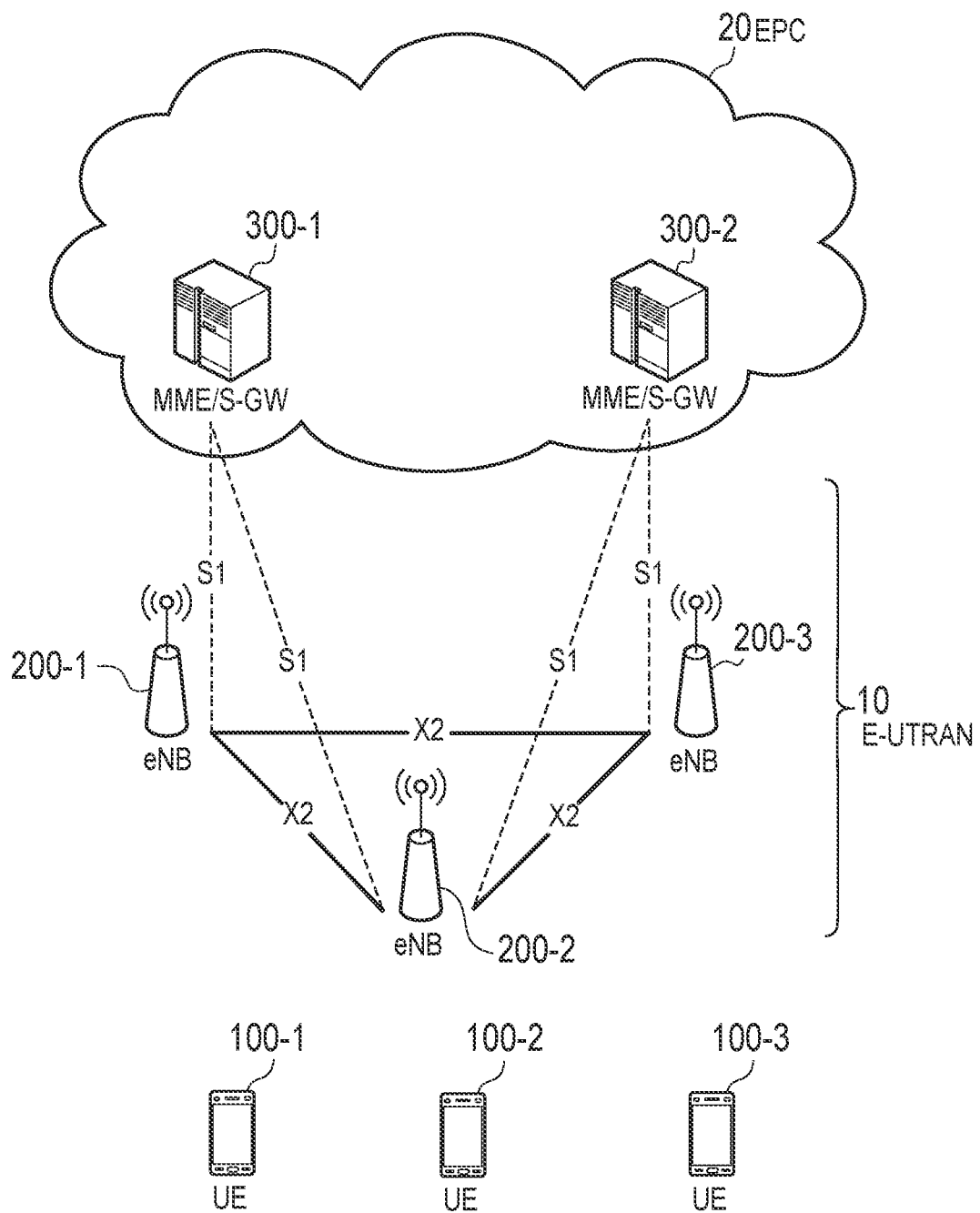
FIG. 1 is a diagram illustrating a configuration of a Long Term Evolution (LTE) system.

A user terminal according to a first embodiment transmits uplink data to a base station using an unlicensed band. The user terminal includes a controller configured to, if uplink data transmission is started from a middle of a subframe according to a monitoring result of the unlicensed band, perform processing of transmitting a specific signal being different from the uplink data, at a beginning of the uplink data.

In the first embodiment, the controller is configured to perform processing of transmitting the specific signal only within a range in the unlicensed band that corresponds to a frequency resource allocated from the base station.

In the first embodiment, the controller is configured to, if uplink data transmission is continued over a time length longer than one subframe, perform processing of transmitting a predetermined signal being different from the uplink data, or the specific signal, for each time length of one subframe.

A user terminal according to a second embodiment transmits uplink data to a base station using an unlicensed band. The user terminal includes a controller configured to select, according to a monitoring result of the unlicensed band, one of a plurality of candidate timings configured in one subframe, and to start transmission of the uplink data at the selected candidate timing.

In the second embodiment, the one subframe includes a plurality of sections each provided with a demodulation reference signal. Each of the plurality of candidate timings is configured at a position anterior to a last section of the plurality of sections.

A base station according to a third embodiment performs communication with a user terminal configured to transmit uplink data using an unlicensed band. The base station includes a controller configured to, if the user terminal performs uplink data transmission across a subframe boundary according to a monitoring result of the unlicensed band, consecutively allocate a same frequency resource in the unlicensed band to the user terminal for a certain period of time. The subframe boundary is a boundary between two consecutive subframes.

A base station according to a fourth embodiment performs communication with a user terminal configured to transmit uplink data using an unlicensed band. The base station includes a controller configured to, if the user terminal performs uplink data transmission across a subframe boundary according to a monitoring result of the unlicensed band, allocate a plurality of consecutive subframes to the user terminal. The subframe boundary is a boundary between two consecutive subframes.

In the fourth embodiment, the controller is configured to, when transmitting, to the user terminal, allocation information corresponding to a first subframe of the plurality of consecutive subframes, include, in the allocation information, information of a subframe following the first subframe of the plurality of consecutive subframes.

A base station according to a fifth embodiment performs communication with a user terminal configured to transmit uplink data using an unlicensed band. The base station includes a controller configured to, if allocating a frequency resource included in the unlicensed band, to a first user terminal, and then, allocating the frequency resource to a second user terminal, allocate the frequency resource to the second user terminal after a certain time interval from an end of an allocation period with respect to the first user terminal.

A user terminal according to a sixth embodiment transmits uplink data to a base station using an unlicensed band. The user terminal includes a controller configured to, if it is determined, based on a monitoring result of the unlicensed band, that transmission of uplink data can be started, perform processing of transmitting a notice related to a start of uplink data transmission, to another user terminal.

A user terminal according to a sixth embodiment transmits uplink data to a base station using an unlicensed band. The user terminal includes: a receiver configured to receive a notice related to a start of transmission of the uplink data, from another user terminal that has determined, based on a monitoring result of the unlicensed band, that transmission of uplink data can be started; and a controller configured to perform, based on the notice, control of synchronizing a timing at which transmission of uplink data is to be started in the user terminal, with a timing at which transmission of uplink data is to be started in the another user terminal.

A base station according to a sixth embodiment receives uplink data from a user terminal using an unlicensed band. The base station includes: a receiver configured to receive a notice related to a start of transmission of the uplink data, from the user terminal that has determined, based on a monitoring result of the unlicensed band, that transmission of the uplink data by the user terminal can be started; and a controller configured to determine, based on the notice, a start timing of transmission of the uplink data.

[Mobile Communication System]

A Long Term Evolution (LTE) system being a mobile communication system according to an embodiment will be described below.

(System Configuration)

FIG. 1 is a diagram illustrating a configuration of the LTE system. As illustrated in FIG. 1, the LTE system includes a User Equipment (UE) 100, an Evolved-UMTS Terrestrial Radio Access Network (E-UTRAN) 10, and an Evolved Packet Core (EPC) 20.

The UE 100 corresponds to a user terminal. The UE 100 is a mobile communication apparatus, and performs radio communication with a cell (serving cell). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells, and performs radio communication with the UE 100 that has established connection with the own cells. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area, and furthermore, also used as a term indicating a function of performing radio communication with the UE 100.

The EPC 20 corresponds to a core network. The EPC 20 includes a Mobility Management Entity (MME)/Serving-Gateway (S-GW) 300. The MME performs various types of mobility control for the UE 100, and the like. The S-GW performs transfer control of data. The MME/S-GW 300 is connected with the eNB 200 via an S1 interface. The E-UTRAN 10 and the EPC 20 form a network.

Figure 2:
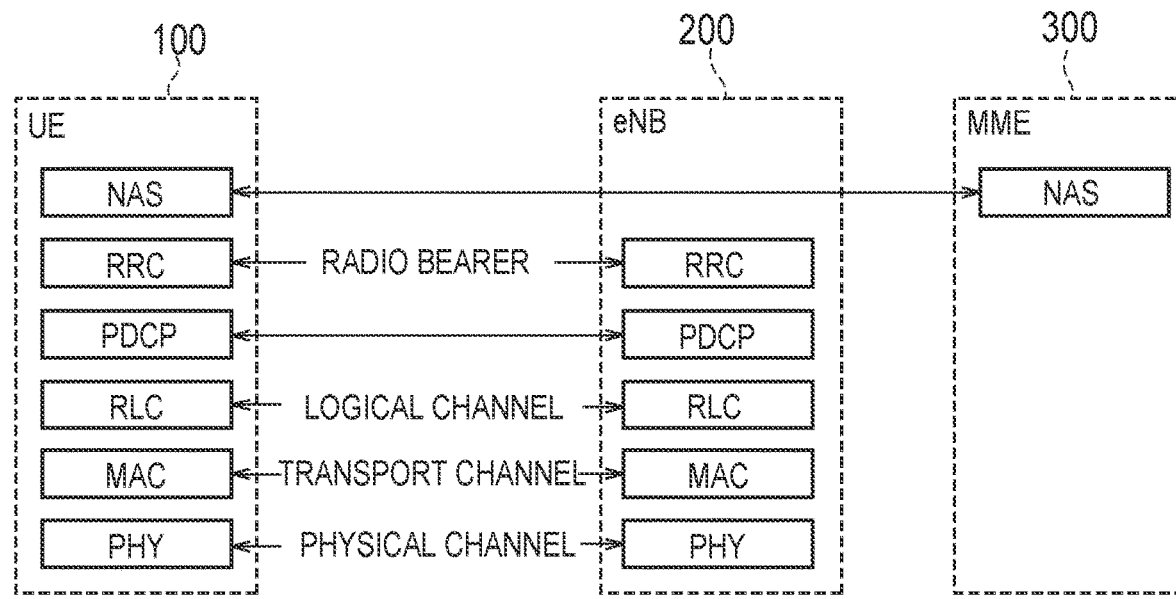
FIG. 2 is a protocol stack diagram of a radio interface in the LTE system.

FIG. 2 is a protocol stack diagram of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signals are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signals are transferred via a transport channel. The MAC layer of the eNB 200 includes a scheduler for deciding a transport format (transport block size (TBS) and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control signals are transferred via a logical channel.

The PDCP layer performs header compression/decompression, and encryption/decryption.

The RRC layer is defined only in a control plane handling control signals. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If not, the UE 100 is in an RRC idle state.

A non-access stratum (NAS) layer located above the RRC layer performs session management, mobility management, and the like.

Figure 3:
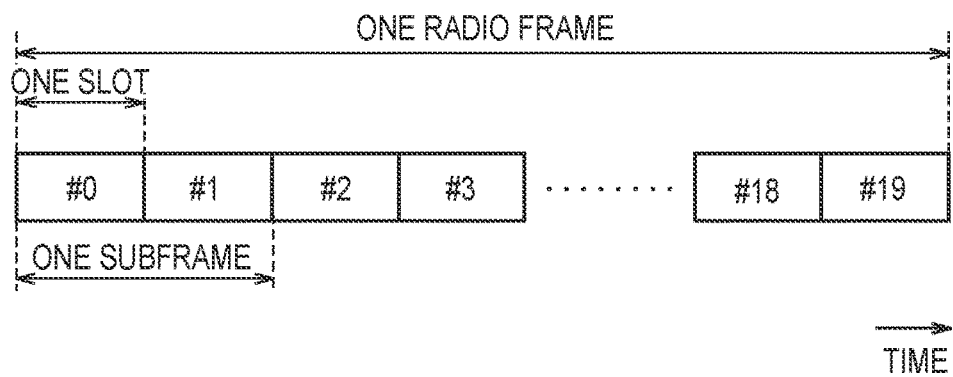
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) and Single Carrier Frequency Division Multiple Access (SC-FDMA) are applied to downlink and uplink, respectively.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is constituted by one symbol and one subcarrier. In addition, among radio resources (time/frequency resources) to be allocated to the UE 100, a frequency resource can be identified by resource blocks and a time resource can be identified by subframes (or slots).

In downlink, a section corresponding to beginning several symbols of each subframe is a region used as a physical downlink control channel (PDCCH) for transferring mainly a downlink control signal (Downlink Control Information (DCI)). The details of the PDCCH will be described later. In addition, a remaining part of each subframe is a region that can be used as a physical downlink shared channel (PDSCH) for transferring mainly downlink data.

In uplink, both end portions in the frequency direction of each subframe are regions used as a physical uplink control channel (PUCCH) for transferring mainly an uplink control signal. A remaining part of each subframe is a region that can be used as a physical uplink shared channel (PUSCH) for transferring mainly uplink data.

(Unlicensed Band)

The LTE system according to the embodiment uses, for LTE communication, not only a licensed band in which a license is granted to an operator, but also an unlicensed band not requiring a license. More specifically, the unlicensed band becomes accessible by the assist of the licensed band. Such a structure will be referred to as licensed-assisted access (LAA).

Figure 4:
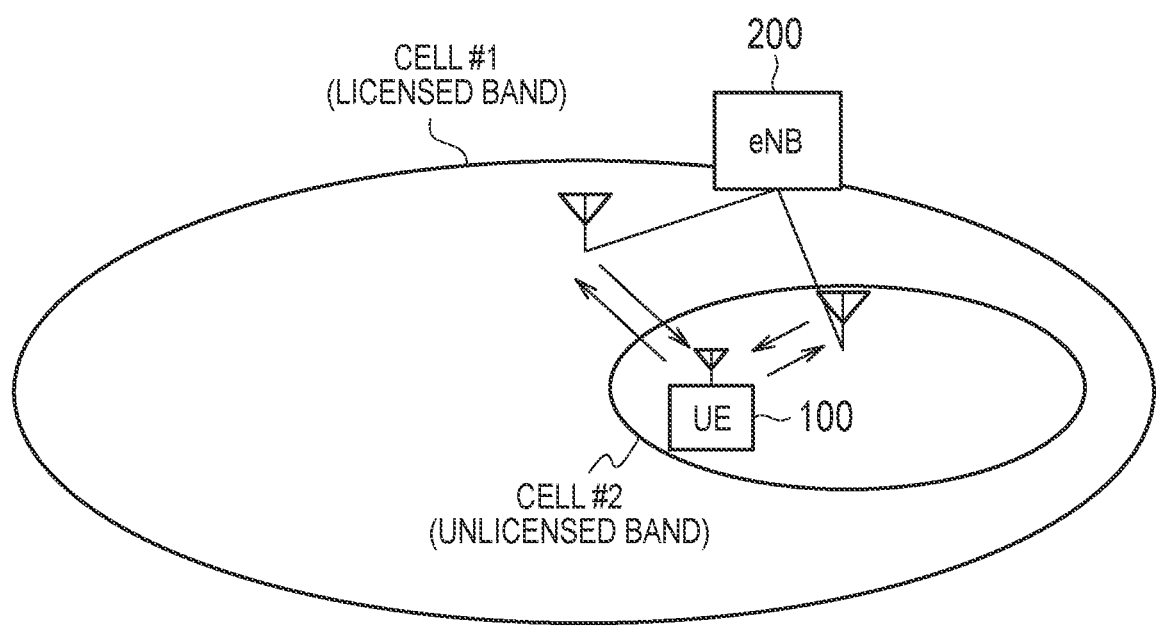
FIG. 4 is a diagram for illustrating LAA.

FIG. 4 is a diagram for illustrating LAA. As illustrated in FIG. 4, the eNB 200 manages a cell #1 operated in the licensed band, and a cell #2 operated in the unlicensed band. FIG. 4 illustrates an example in which the cell #1 is a macro cell, and the cell #2 is a small cell. Nevertheless, cell sizes are not limited to this.

The UE 100 is positioned in an overlapped area of the cell #1 and the cell #2. The UE 100 sets the cell #1 as a primary cell (PCell), and sets the cell #2 as a secondary cell (SCell), and performs communication by carrier aggregation (CA).

In the example in FIG. 4, the UE 100 performs uplink communication and downlink communication with the cell #1, and performs uplink communication and downlink communication with the cell #2. By such carrier aggregation, the UE 100 is provided with radio resources in the unlicensed band, in addition to radio resources in the licensed band. Thus, throughput can be enhanced. The eNB 200 notifies, via the licensed band, the UE 100 of resource allocation information in the unlicensed band, or notifies, via the unlicensed band, the UE 100 of the resource allocation information.

In the embodiment, uplink communication in the cell #2 (unlicensed band) will be mainly described.

(LBT)

In the unlicensed band, a LBT procedure is required for avoiding interference with another system (wireless local area network (LAN), etc.) being different from an LTE system, or with an LTE system of another operator. The LBT has two methods including a Frame Based Equipment (FBE) method and a Load Based Equipment (LBE) method. The FBE method is a method in which a timing is fixed. In contrast to this, the LBE method is a method in which a timing is not fixed.

Figure 5:
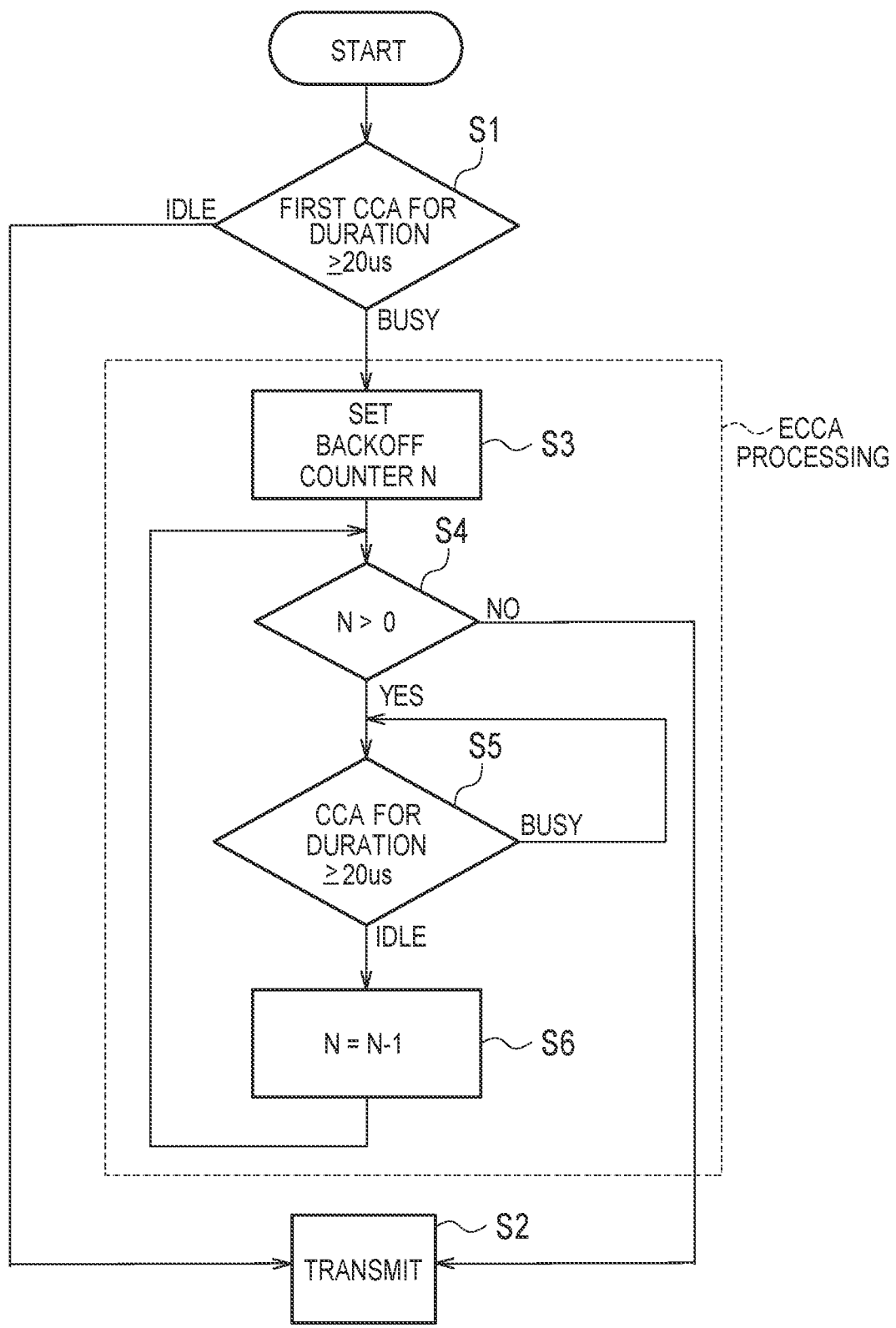
FIG. 5 is a flowchart illustrating an example of LBT of an LBE method.

In the following embodiment, a case in which the LBE method is applied to uplink communication in the unlicensed band will be assumed. FIG. 5 is a flowchart illustrating an example of LBT of the LBE method. The UE 100 executes this flow for a target frequency (target carrier) in the unlicensed band.

As illustrated in FIG. 5, the UE 100 monitors the target frequency, and determines, based on reception power (interference power), whether the target frequency is vacant (step S1). Such determination will be referred to as Clear Channel Assessment (CCA). More specifically, if a state in which detected power is larger than a threshold endures for a certain period of time (20 µs in the example in the drawing) or more, the UE 100 determines that the target frequency is being used (Busy). If not, the UE 100 determines that the target frequency is vacant (Idle), and transmits uplink data to the eNB 200 using the target frequency (step S2).

If the UE 100 determines, as a result of such first CCA, that the target frequency is being used (Busy), the UE 100 shifts to Extended Clear Channel Assessment (ECCA) processing. In the ECCA processing, the UE 100 sets a counter (N) having a default value of N (step S3). N is a random number from four to 32. The UE 100 decrements N (i.e., subtracts one from N) each time CCA succeeds (steps S5 and S6). If N reaches zero (step S4: No), the UE 100 determines that the target frequency is vacant (Idle), and transmits uplink data to the eNB 200 using the target frequency (step S2).

(User Terminal)

Figure 6:
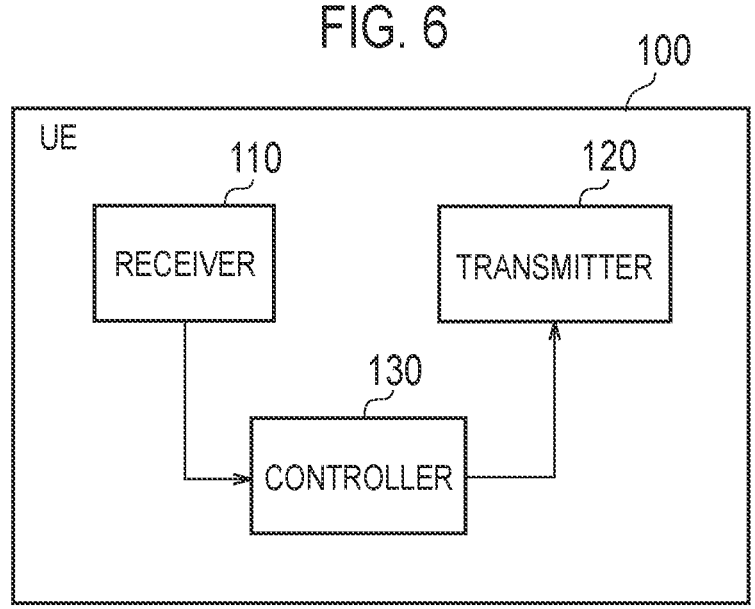
FIG. 6 is a block diagram of a user equipment (UE).

The configuration of the UE 100 (user terminal) according to the embodiment will be described below. FIG. 6 is a block diagram of the UE 100. As illustrated in FIG. 6, the UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna, into a baseband signal (reception signal), and outputs the baseband signal to the controller 130. The receiver 110 may include a first receiving device that receives a radio signal in the licensed band, and a second receiving device that receives a radio signal in the unlicensed band.

The transmitter 120 performs various types of transmission under the control of the controller 130. The transmitter 120 includes an antenna and a transmission device. The transmission device converts a baseband signal (transmission signal) output by the controller 130, into a radio signal, and transmits the radio signal from the antenna. The transmitter 120 may include a first transmission device that transmits a radio signal in the licensed band, and a second transmission device that transmits a radio signal in the unlicensed band.

The controller 130 performs various types of control in the UE 100. The controller 130 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor may include a codec that performs encoding/decoding of an audio/video signal. The processor executes various types of processing to be described later and various types of communication protocols mentioned above.

(Base Station)

Figure 7:
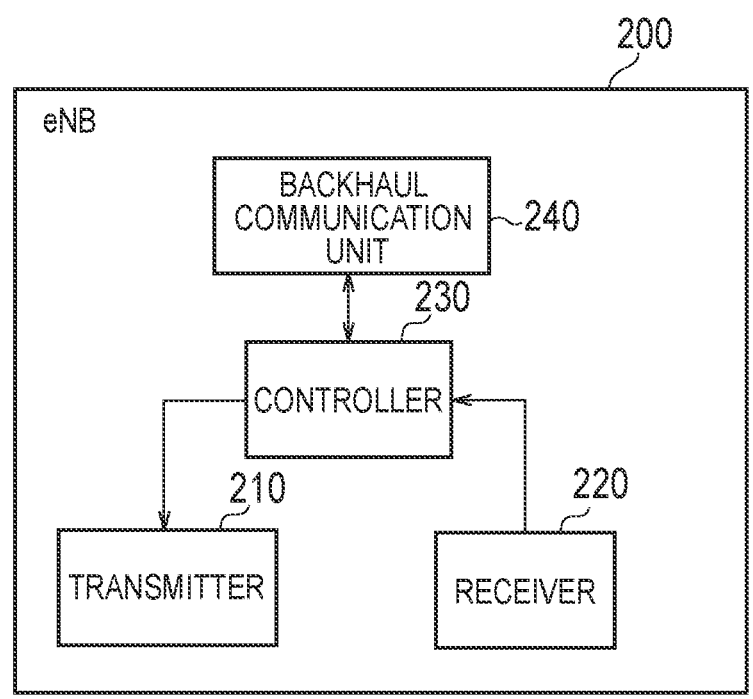
FIG. 7 is a block diagram of an evolved Node-B (eNB).

The configuration of the eNB 200 (base station) will be described below. FIG. 7 is a block diagram of the eNB 200. As illustrated in FIG. 7, the eNB 200 includes a transmitter 210, a receiver 220, a controller 230, and a backhaul communication unit 240.

The transmitter 210 performs various types of transmission under the control of the controller 230. The transmitter 210 includes an antenna and a transmission device. The transmission device converts a baseband signal (transmission signal) output by the controller 230, into a radio signal, and transmits the radio signal from the antenna. The transmitter 210 may include a first transmission device that transmits a radio signal in the licensed band, and a second transmission device that transmits a radio signal in the unlicensed band.

The receiver 220 performs various types of reception under the control of the controller 230. The receiver 220 includes an antenna and a receiving device. The receiving device converts a radio signal received by the antenna, into a baseband signal (reception signal), and outputs the baseband signal to the controller 230. The receiver 220 may include a first receiving device that receives a radio signal in the licensed band, and a second receiving device that receives a radio signal in the unlicensed band.

The controller 230 performs various types of control in the eNB 200. The controller 230 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected with an adjacent eNB 200 via the X2 interface, and connected with the MME/S-GW 300 via the S1 interface. The backhaul communication unit 240 is used for communication performed on the X2 interface, communication performed on the S1 interface, and the like.

First Embodiment

A first embodiment will be described below.

(Example of Operating Environment)

Figure 8:
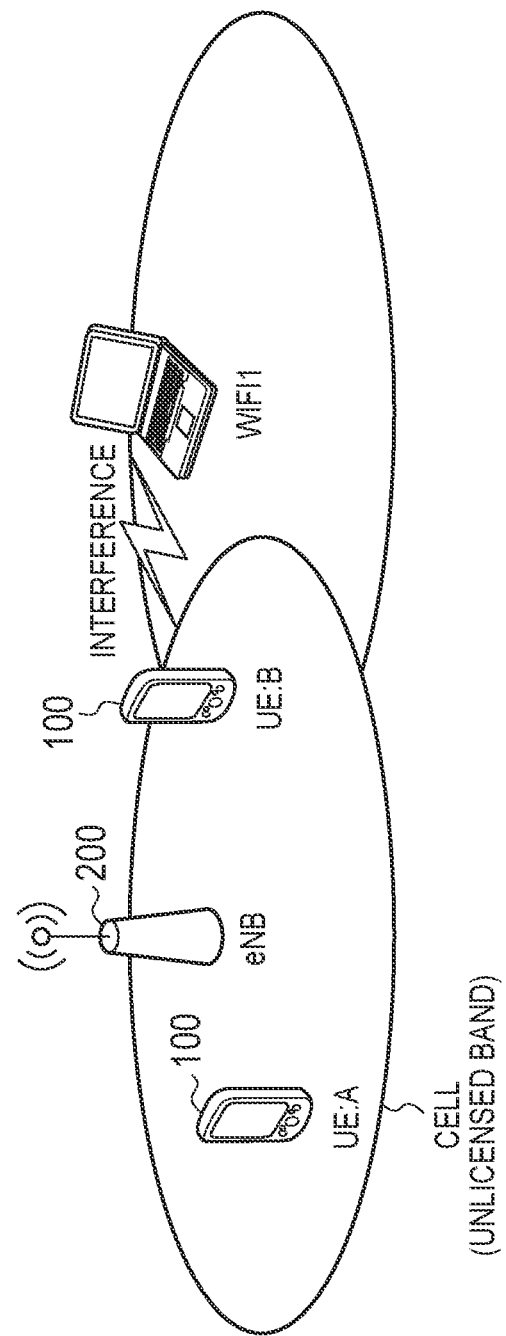
FIG. 8 is a diagram illustrating an example of an operating environment according to first to fifth embodiments.

FIG. 8 is a diagram illustrating an example of an operating environment according to the first embodiment. As illustrated in FIG. 8, a UE 100 (A) and a UE 100 (B) in an RRC connected mode are positioned in a cell of the eNB 200. The cell is a cell belonging to a frequency in the unlicensed band. The UE 100 (A) and the UE 100 (B) each perform LBT of the LBE method, and transmit uplink data to the eNB 200. FIG. 8 illustrates an example in which a WLAN device (WiFi 1) is positioned near the UE 100 (B), and the UE 100 (B) is affected by the influence of interference from the WLAN device.

Figure 9:
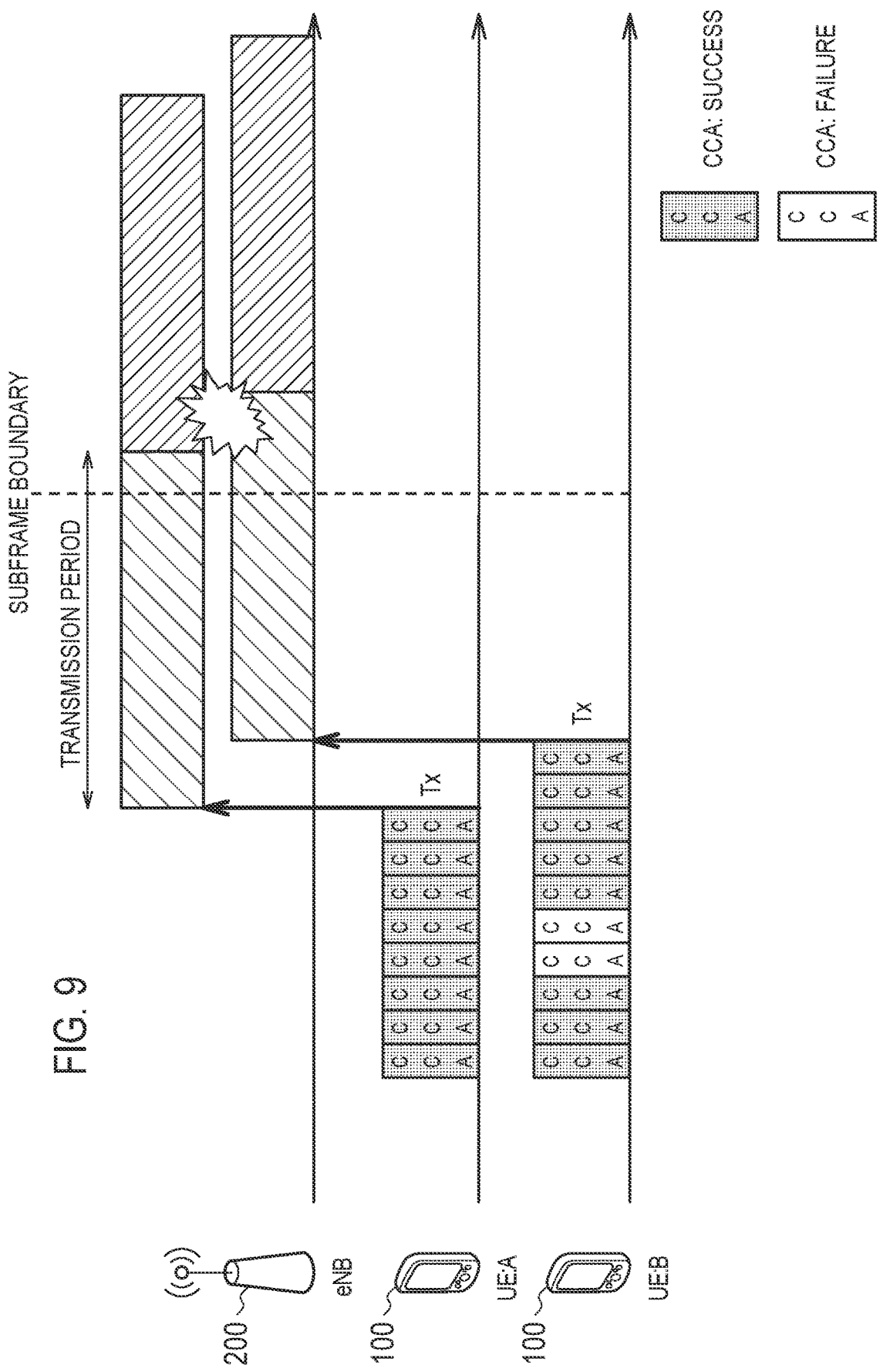
FIG. 9 is a diagram illustrating a first example of an uplink transmission operation.
Figure 10:
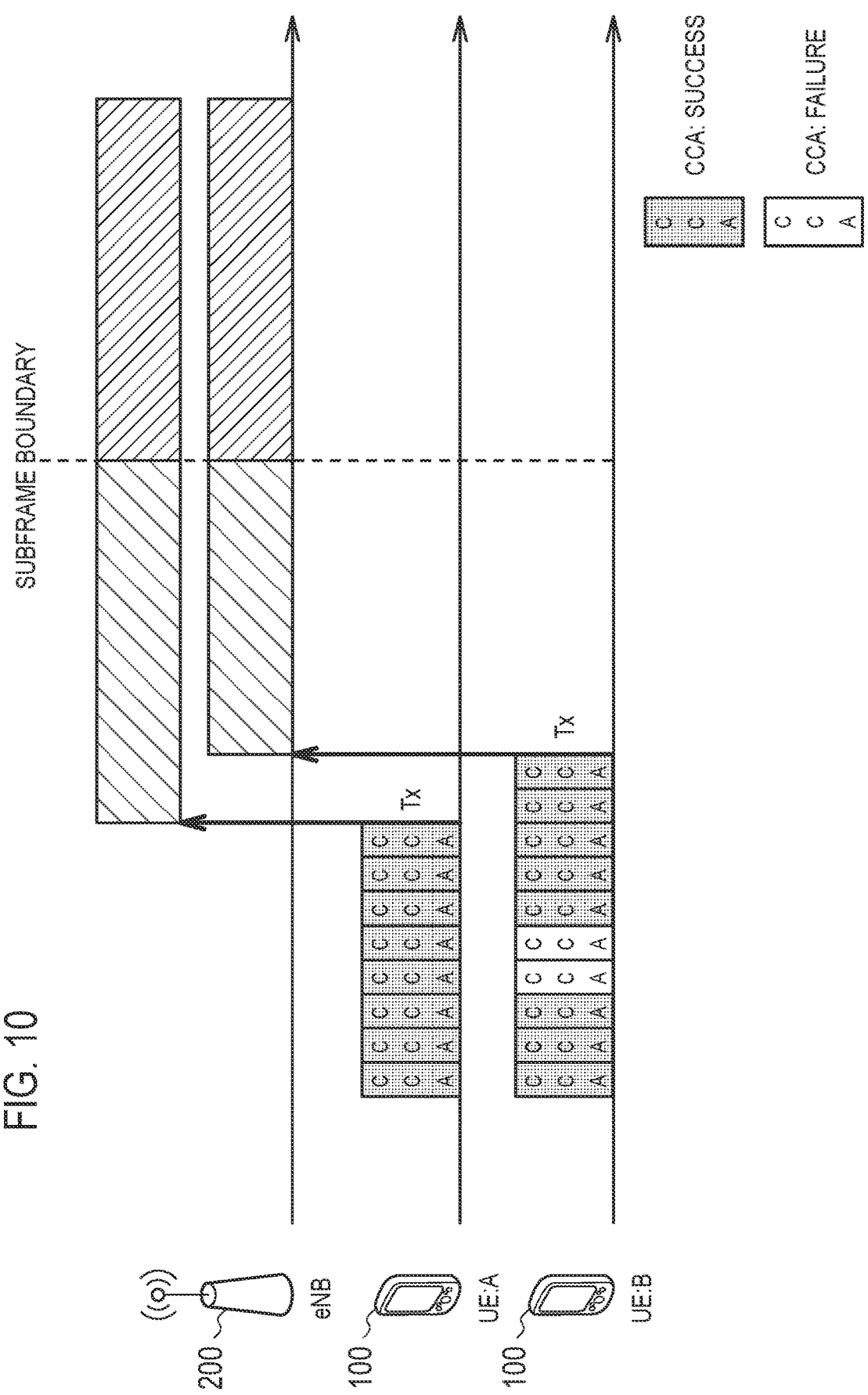
FIG. 10 is a diagram illustrating a second example of an uplink transmission operation.

FIGS. 9 and 10 are diagram illustrating an uplink transmission operation of each UE 100 in the operating environment illustrated in FIG. 8. FIG. 9 illustrates a first example of the uplink transmission operation, and FIG. 10 illustrates a second example of the uplink transmission operation.

As illustrated in FIG. 9, each UE 100 performs the ECCA processing when performing the aforementioned LBT of the LBE method. Because each UE 100 uniquely holds a counter (N) of LBE, an uplink transmission start timing may vary for each UE 100. In this example, the counter of LBE of the UE 100 (B) is "eight". More specifically, the UE 100 (B) has succeeded in CCA three times, and then, has failed twice. The UE 100 (B) performs uplink transmission (Tx) after five more successes of CCA. An uplink transmission start timing of the UE 100 (B) is later than an uplink transmission start timing of the UE 100 (A).

In the first example of the uplink transmission operation, according to a monitoring (i.e., CCA) result of the unlicensed band, each UE 100 performs data transmission across a subframe boundary (i.e., may be a boundary between two consecutive subframes. The same hereinafter). In other words, according to the monitoring (i.e., CCA) result of the unlicensed band, each UE 100 consecutively performs data transmission from a predetermined position in one subframe to a predetermined position in another subframe adjacent to the one subframe. Hereinafter, similar expressions may have meaning similar to the preceding sentence. Each UE 100 continues data transmission over a predetermined transmission period from an uplink transmission start timing. The predetermined transmission period is a period equal to a time length (1 ms) of a subframe. FIG. 9 illustrates an example in which each UE 100 continues data transmission over two transmission periods.

Uplink of general LTE assumes that the eNB 200 allocates an uplink radio resource to each UE 100 on a subframe basis, to perform uplink transmission. Nevertheless, if each UE 100 performs uplink data transmission across the subframe boundary, it is difficult to allocate an uplink radio resource on a subframe basis.

The second example of the uplink transmission operation illustrated in FIG. 10 is an example in which each UE 100 ends uplink transmission at the subframe boundary. According to the second example, allocation of uplink radio resources is easy as compared with the first example. Nevertheless, similarly to the first example, an uplink transmission start timing varies for each UE 100. It is therefore difficult for the eNB 200 to identify an uplink transmission start timing of each UE 100. In addition, if one subframe is allocated to a certain UE 100, the UE 100 may be unable to perform uplink transmission in the subframe due to the ECCA processing.

Operation According to First Embodiment

The first embodiment is an embodiment related to an operation of enabling the eNB 200 to identify an uplink transmission start timing of each UE 100.

The UE 100 according to the first embodiment transmits uplink data to the eNB 200 using the unlicensed band. If the UE 100 starts uplink data transmission from the middle of a subframe, according to a monitoring result (CCA result) of the unlicensed band, the UE 100 transmits a specific signal (hereinafter, referred to as "Initial signal") being different from uplink data, at the beginning of the uplink data. In other words, this may mean that the UE 100 transmits the specific signal at the beginning of a period in which uplink data can be transmitted, and subsequently, transmits uplink data, or the UE 100 transmits the specific signal as part of uplink data.

Here, the "Initial signal" is a synchronization signal and/or a control channel signal, for example. The control channel signal may be masked using an identifier (e.g., C-RNTI) of the UE 100, or an identifier (Physical Cell ID) of the cell. By detecting a synchronization signal from the UE 100, the eNB 200 can detect the beginning of uplink data in the middle of a subframe. Alternatively, by decoding a control channel signal from the UE 100 by blind decoding, the eNB 200 can detect the beginning of uplink data in the middle of a subframe. In addition, the UE 100 needs not transmit the "Initial signal" if uplink data transmission is started from the subframe beginning.

In the first embodiment, the UE 100 performs processing of transmitting the "Initial signal" only within a range in the unlicensed band that corresponds to frequency resources allocated from the eNB 200. This can suppress the occurrence of interference caused by the "Initial signal".

Figure 11:
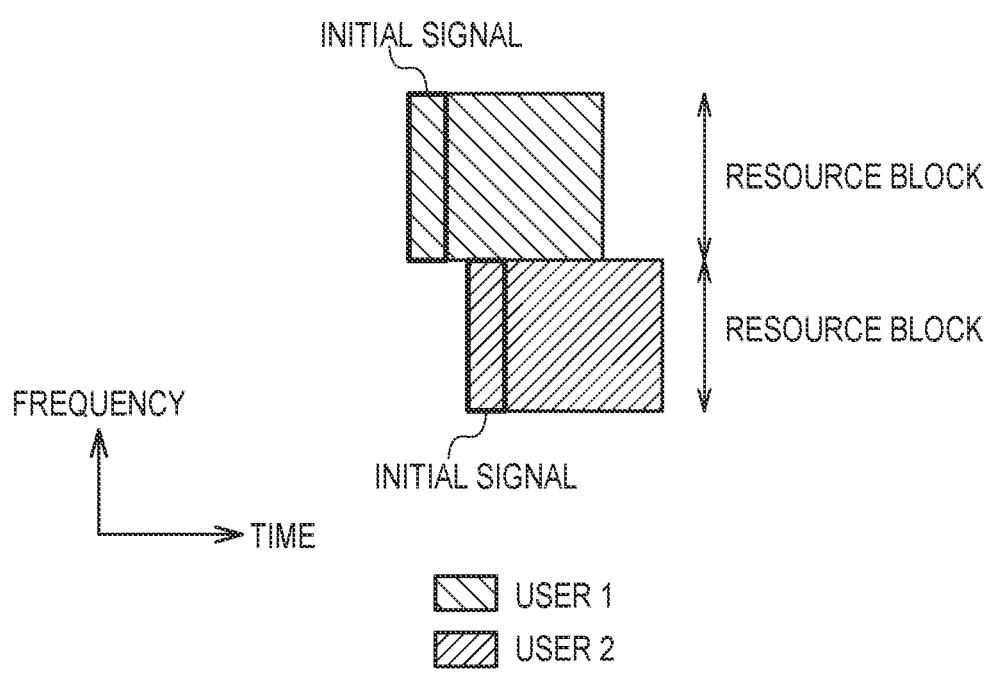
FIG. 11 is a diagram illustrating a transmission example 1 of a specific signal according to the first embodiment.

FIG. 11 is a diagram illustrating a transmission example 1 of the "Initial signal". FIG. 11 illustrates an example in which frequency resource allocation is performed on a resource block (RB) basis. Nevertheless, allocation is not limited to resource block (RB) basis, and allocation on a subcarrier basis may be performed. In addition, an example in which one resource block is allocated to each UE is illustrated. Nevertheless, a plurality of resource blocks may be allocated to each UE. As illustrated in FIG. 11, according to a CCA result, each UE 100 transmits uplink data using a resource block allocated from the eNB 200. Each UE 100 transmits the "Initial signal" at the beginning of the uplink data.

Figure 12:
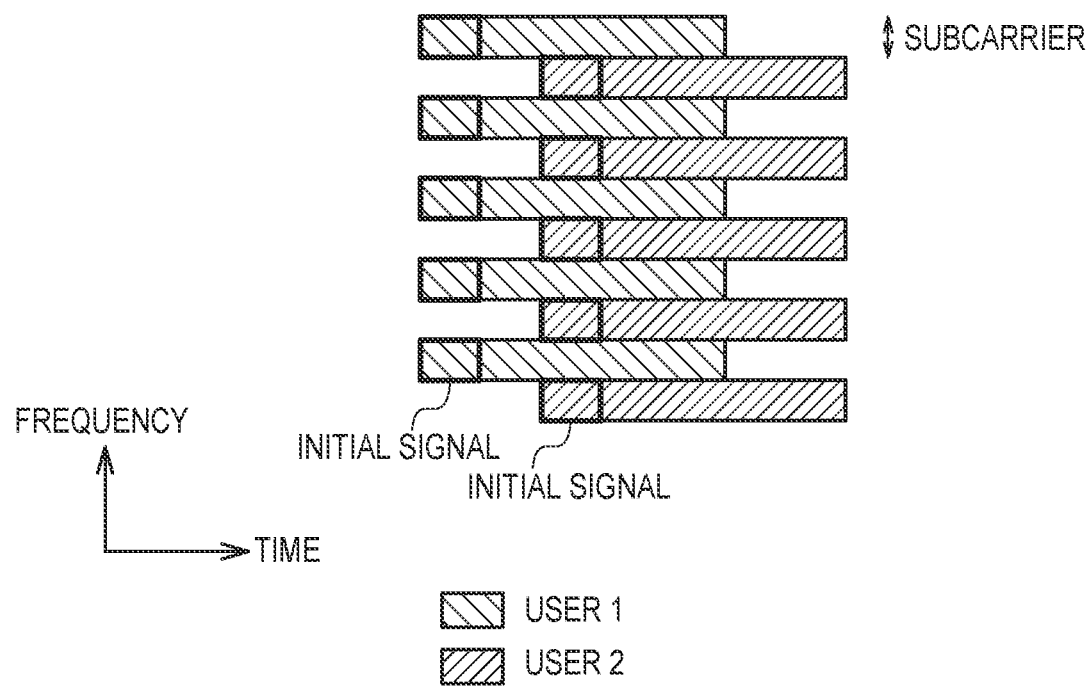
FIG. 12 is a diagram illustrating a transmission example 2 of a specific signal according to the second embodiment.

FIG. 12 is a diagram illustrating a transmission example 2 of the "Initial signal". FIG. 12 illustrates an example in which frequency resource allocation is performed on a subcarrier basis. More specifically, subcarriers are allocated to UEs 100 from the eNB 200 in a comb-like manner. For example, an odd-numbered subcarrier is allocated to a certain UE 100, and an even-numbered subcarrier is allocated to another UE 100. Nevertheless, allocation is not limited to a subcarrier basis, and resource blocks may be allocated in a comb-like manner. In addition, an example in which a frequency interval of comb-like subcarriers is one-subcarrier interval is illustrated. Nevertheless, the frequency interval is not limited to one-subcarrier interval, and may be an interval including a plurality of subcarriers. As illustrated in FIG. 12, according to a CCA result, each UE 100 transmits uplink data using a subcarrier allocated from the eNB 200. Each UE 100 transmits the "Initial signal" at the beginning of the uplink data.

In the first embodiment, if the UE 100 continues uplink data transmission over a time length longer than one subframe, the UE 100 transmits a predetermined signal being different from uplink data, for each time length of one subframe. The predetermined signal may be a synchronization signal and/or a control channel signal similarly to the aforementioned "Initial signal". If the predetermined signal is a synchronization signal, a signal sequence being different from a signal sequence applied to the "Initial signal" may be applied to the predetermined signal. If the predetermined signal is a control channel signal, information indicating that uplink data following the predetermined signal is not first transmission may be included in the predetermined signal.

If a situation as illustrated in FIG. 9 is assumed, each UE 100 transmits a specific signal to the eNB 200 at the beginning of a first transmission period set according to a CCA result. Nevertheless, the eNB 200 can fail in the detection of the specific signal. If the eNB 200 fails in the detection of the specific signal, the eNB 200 cannot receive uplink data in the first transmission period, and furthermore, cannot receive uplink data of a subsequent transmission period, either. By each UE 100 transmitting the specific signal for each time length of one subframe, the eNB 200 can receive uplink data of the subsequent transmission period.

The eNB 200 may issue a transmission instruction of the "Initial signal" to the UE 100 using a PDCCH. More specifically, the eNB 200 includes, in downlink control information (DCI), information indicating the transmission instruction of the "Initial signal". The DCI is transmitted to the UE 100 in the unlicensed band, or transmitted to the UE 100 in the licensed band (i.e., cross-carrier scheduling). The eNB 200 may also issue a transmission instruction of the predetermined signal similarly to the transmission instruction of the "Initial signal".

Second Embodiment

A second embodiment will be described mainly based on a difference from the first embodiment. Similarly to the first embodiment, the second embodiment is an embodiment related to an operation of enabling the eNB 200 to identify an uplink transmission start timing of each UE 100.

According to a CCA result of the unlicensed band, the UE 100 according to the second embodiment selects one of a plurality of candidate timings configured in one subframe, and starts uplink data transmission at the selected candidate timing. The plurality of candidate timings is configured in the UE 100 from the eNB 200. Alternatively, the plurality of candidate timings is predefined by specifications of the LTE system. In this manner, by restricting a candidate timing at which the UE 100 can start uplink data transmission, the eNB 200 can try reception of uplink data at each candidate timing.

In the second embodiment, a subframe includes a plurality of sections each provided with a demodulation reference signal (DMRS), and each of the plurality of candidate timings is configured at a position anterior to the last section of the plurality of sections.

Figure 13:
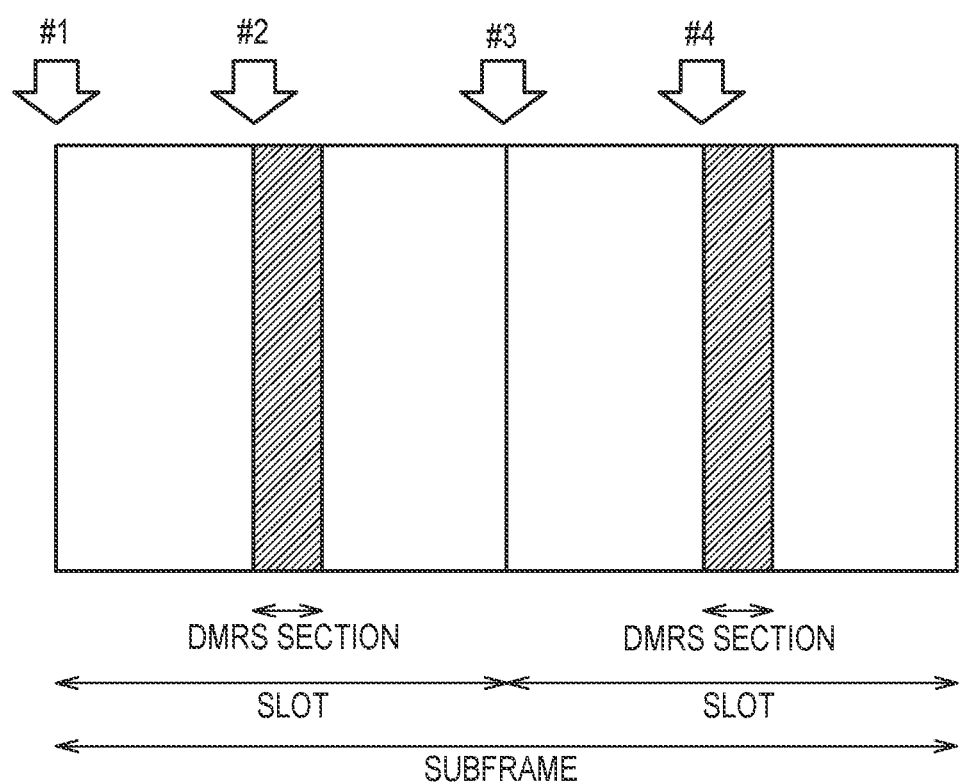
FIG. 13 is a diagram for illustrating a plurality of candidate timings according to the second embodiment.

FIG. 13 is a diagram for illustrating a plurality of candidate timings according to the second embodiment. As illustrated in FIG. 13, four candidate timings (timings #1 to #4) are configured in a subframe. The candidate timing # is a leading timing of the subframe, the candidate timing #2 is a middle timing of a first-half slot, the candidate timing #3 is a leading timing of a second-half slot, and the candidate timing #4 is a middle timing of the second-half slot. In addition, the subframe has a DMRS section in each of the first-half slot and the second-half slot. Each of the candidate timings #1 to #4 is configured at a position anterior to the DMRS section of the second-half slot. With this configuration, the UE 100 can transmit a DMRS at least once if the UE 100 starts uplink data transmission at any of the candidate timings #1 to #4. Thus, the eNB 200 can appropriately demodulate uplink data.

Third Embodiment

A third embodiment will be described mainly based on a difference from the first and second embodiments. The third embodiment assumes the first example of the uplink transmission operation as illustrated in FIG. 9. More specifically, each UE 100 performs data transmission across a subframe boundary according to a CCA result.

If the UE 100 performs uplink data transmission across a subframe boundary according to a CCA result, the eNB 200 according to the third embodiment consecutively allocates the same frequency resource in the unlicensed band to the same UE 100 for a certain period of time. For example, the certain period of time is an integer multiple of a time length of a subframe. With this configuration, during the certain period of time, it becomes unnecessary for the eNB 200 to perform scheduling in the frequency, and transmission collision of each UE 100 can be avoided. The eNB 200 may transmit allocation information (DCI) to the UE 100 in the first subframe and the last subframe of the certain period of time. More specifically, the eNB 200 notifies the UE 100 of a frequency resource using DCI, in the first subframe of the certain period of time, and then, notifies the UE 100 of an end of the certain period of time, using DCI, in the last subframe of the certain period of time. In addition, such an allocation method may be limited to a case in which LBT of the LBE method is applied.

Fourth Embodiment

A fourth embodiment will be described mainly based on a difference from the first to third embodiments. Similarly to the third embodiment, the fourth embodiment assumes the first example of the uplink transmission operation as illustrated in FIG. 9. More specifically, each UE 100 performs data transmission across a subframe boundary according to a CCA result.

If the UE 100 performs uplink data transmission across a subframe boundary according to a CCA result of the unlicensed band, the eNB 200 according to the fourth embodiment allocates a plurality of consecutive subframes to the UE 100. With this configuration, even if the UE 100 performs uplink data transmission across the subframe boundary, transmission collision of each UE 100 can be avoided.

Figure 14:
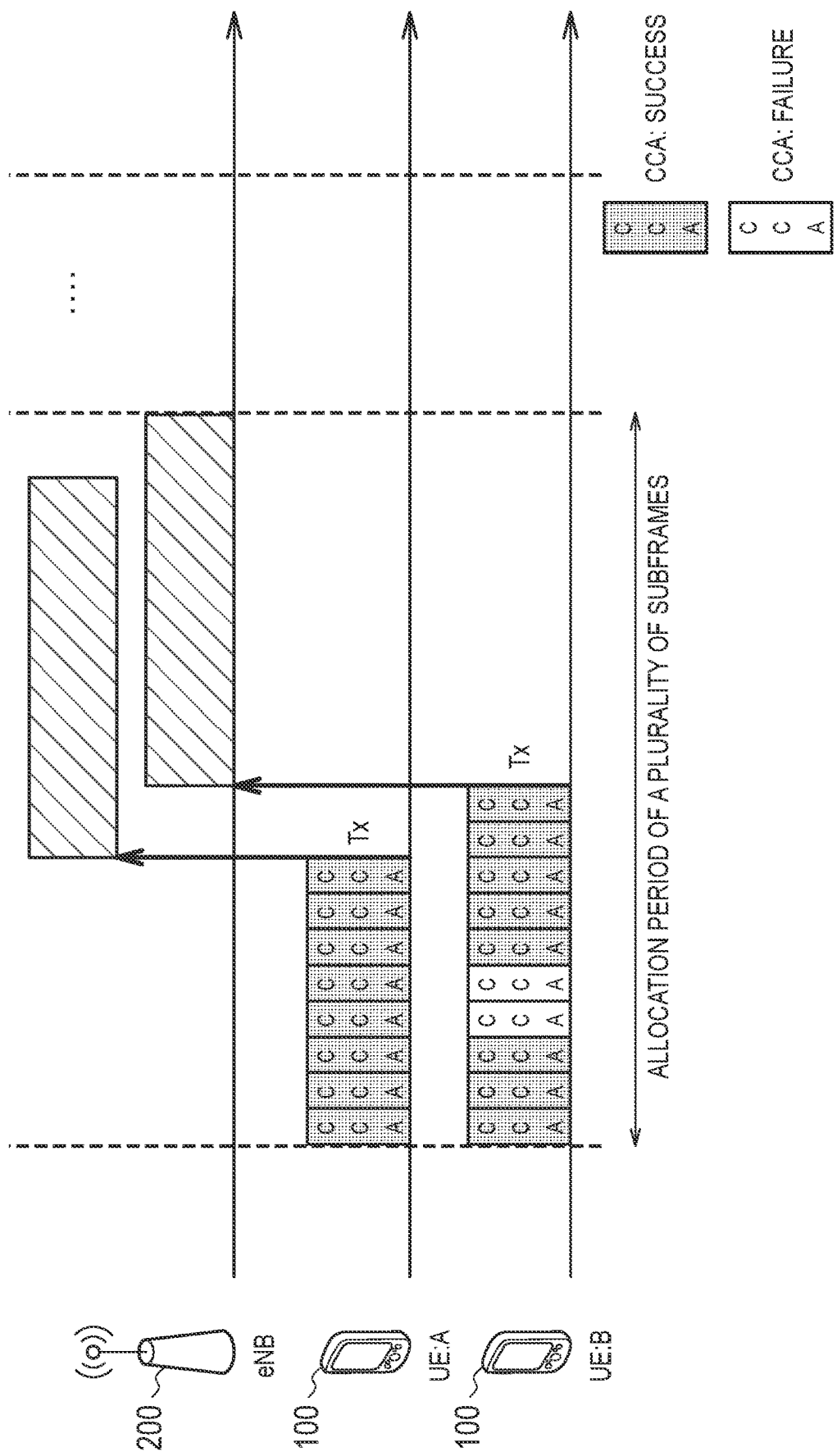
FIG. 14 is a diagram illustrating an example of an operation according to the fourth embodiment.

FIG. 14 is a diagram illustrating an example of an operation according to the fourth embodiment. As illustrated in FIG. 14, in consideration of a time required by the UE 100 for CCA (in particular, ECCA), the eNB 200 allocates a plurality of consecutive subframes to the UE 100 as an allocation unit of a time resource. When the eNB 200 transmits, to the UE 100, allocation information (DCI) corresponding to the first subframe of the plurality of consecutive subframes, the eNB 200 may include, in the allocation information, information of a subframe following the first subframe of the plurality of consecutive subframes. The "information of the following subframe" is at least one of information indicating the number of the following subframe, MCS for the following subframe, TBS, a new data indicator (NDI), an HARQ process ID, the number of RBs, and a transmission mode. The UE 100 recognizes that resource allocation (frequency resource, MCS, etc.) indicated by the allocation information is also applied to the following subframe. In addition, the UE 100 needs to perform CCA processing only before the first subframe of the plurality of consecutive subframes. Thus, the eNB 200 may include, in the allocation information (DCI), information indicating whether it is allocation of the first subframe. In addition, the eNB 200 may include, in the DCI, information indicating whether it is allocation of the last subframe. Each UE 100 performs CCA and uplink data transmission in an allocation period including the plurality of consecutive subframes.

In this case, subframes allocated for CCA, i.e., subframes having a possibility of not being used for uplink transmission are generated. The resource use efficiency can therefore degrade. Thus, for example, the eNB 200 may allocate the same frequency resource to a plurality of UEs 100 being distant from each other, and allocate the same time resource (the plurality of consecutive subframes) to the plurality of UEs 100.

In the fourth embodiment, by the configuration from the eNB 200, for example, a period of ECCA in each UE 100 may be restricted to one subframe at most. If ECCA exceeds the time length of one subframe, each UE 100 waits for the next transmission opportunity (next consecutive subframes). In other words, if the UE 100 cannot perform transmission after waiting one subframe or more, the UE 100 does not perform data transmission in the consecutive subframes allocated from the eNB 200. In this case, the UE 100 may notify, after the lapse of the one subframe, the eNB 200 that data transmission is not performed in the consecutive subframes. The notification may be performed on the licensed band. The eNB 200 may allocate subframes not used by the UE 100, to another UE 100.

Fifth Embodiment

A fifth embodiment will be described mainly based on a difference from the first to fourth embodiments.

As mentioned above, due to CCA (in particular, ECCA), it is difficult for the eNB 200 to allocate the same frequency resource to another UE 100 in the next subframe.

If the eNB 200 according to the fifth embodiment allocates a frequency resource included in the unlicensed band, to a first UE 100, and then, allocates the frequency resource to a second UE 100, the eNB 200 allocates the frequency resource to the second UE 100 after a certain time interval from the end of the allocation period with respect to the first UE 100. With this configuration, especially if the UE 100 performs uplink data transmission across the subframe boundary, transmission collision of each UE 100 can be avoided. The certain time interval may be a time interval of one subframe or more.

Figure 15:
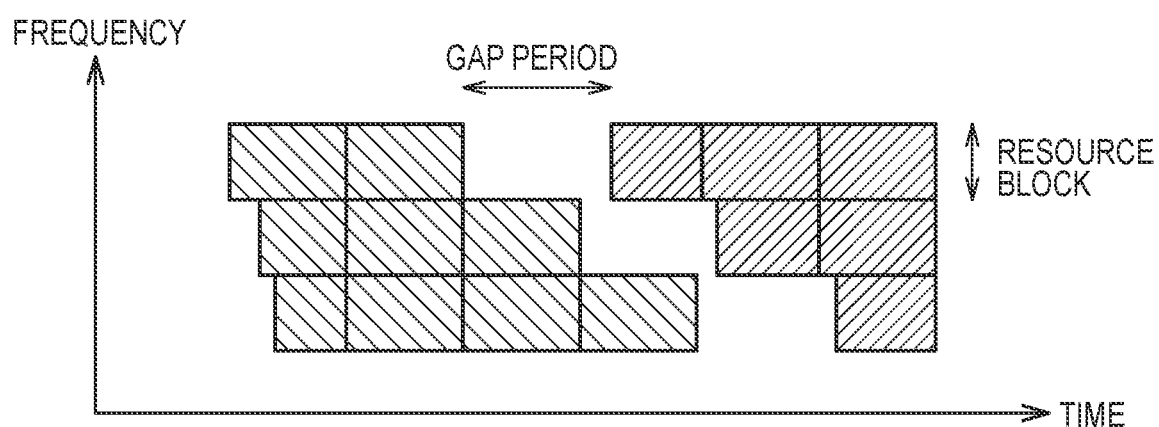
FIG. 15 is a diagram illustrating an example of an operation according to the fifth embodiment.

FIG. 15 is a diagram illustrating an example of an operation according to the fifth embodiment. Here, frequency resource allocation on a resource block basis is assumed. As illustrated in FIG. 15, if the eNB 200 allocates a resource block included in the unlicensed band, to a first UE 100, and then, allocates the resource block to a second UE 100, the eNB 200 allocates the resource block to the second UE 100 after a certain time interval (gap period) from the end of the allocation period with respect to the first UE 100.

FIG. 15 illustrates an example in which a time length of the gap period of each resource block (each frequency resource) is made equal. Nevertheless, time lengths of the gap period may be made different for each resource block (frequency resource).

In addition, a start position of the gap period of each resource block (each frequency resource) may be aligned. Nevertheless, an end position of the gap period (i.e., transmission start timing of each UE 100) of each resource block (each frequency resource) may have a shift caused by the execution of LBT.

Sixth Embodiment

A sixth embodiment will be described mainly based on a difference from the first to fifth embodiments.

The sixth embodiment mainly assumes the first example of the uplink transmission operation as illustrated in FIG. 9. More specifically, each UE 100 performs data transmission across a subframe boundary according to a CCA (LBT) result. In the sixth embodiment, by performing signaling between UEs 100, start timings of uplink data transmission of the UEs 100 are synchronized. This can solve the aforementioned problematic points.

A UE 100 (A) according to the sixth embodiment performs uplink data transmission to the eNB 200 using the unlicensed band. If the UE 100 (A) determines, based on a monitoring result of the unlicensed band, that uplink data transmission can be started, the UE 100 (A) transmits, to another UE 100 (B), a notice related to the start of uplink data transmission. The UE 100 (A) may transmit the notice not only to the another the UE 100 (B) but also to the eNB 200.

In the sixth embodiment, the UE 100 (A) includes, in the notice, information indicating a start timing of uplink data transmission.

The UE 100 (B) according to the sixth embodiment receives the notice related to the start of uplink data transmission, from another UE 100 (A) that has determined, based on the monitoring result of the unlicensed band, that uplink data transmission can be started. Based on the notice, the UE 100 (B) synchronizes a start timing of uplink data transmission in the UE 100 (B) with that in the another UE 100 (A).

Figure 16:
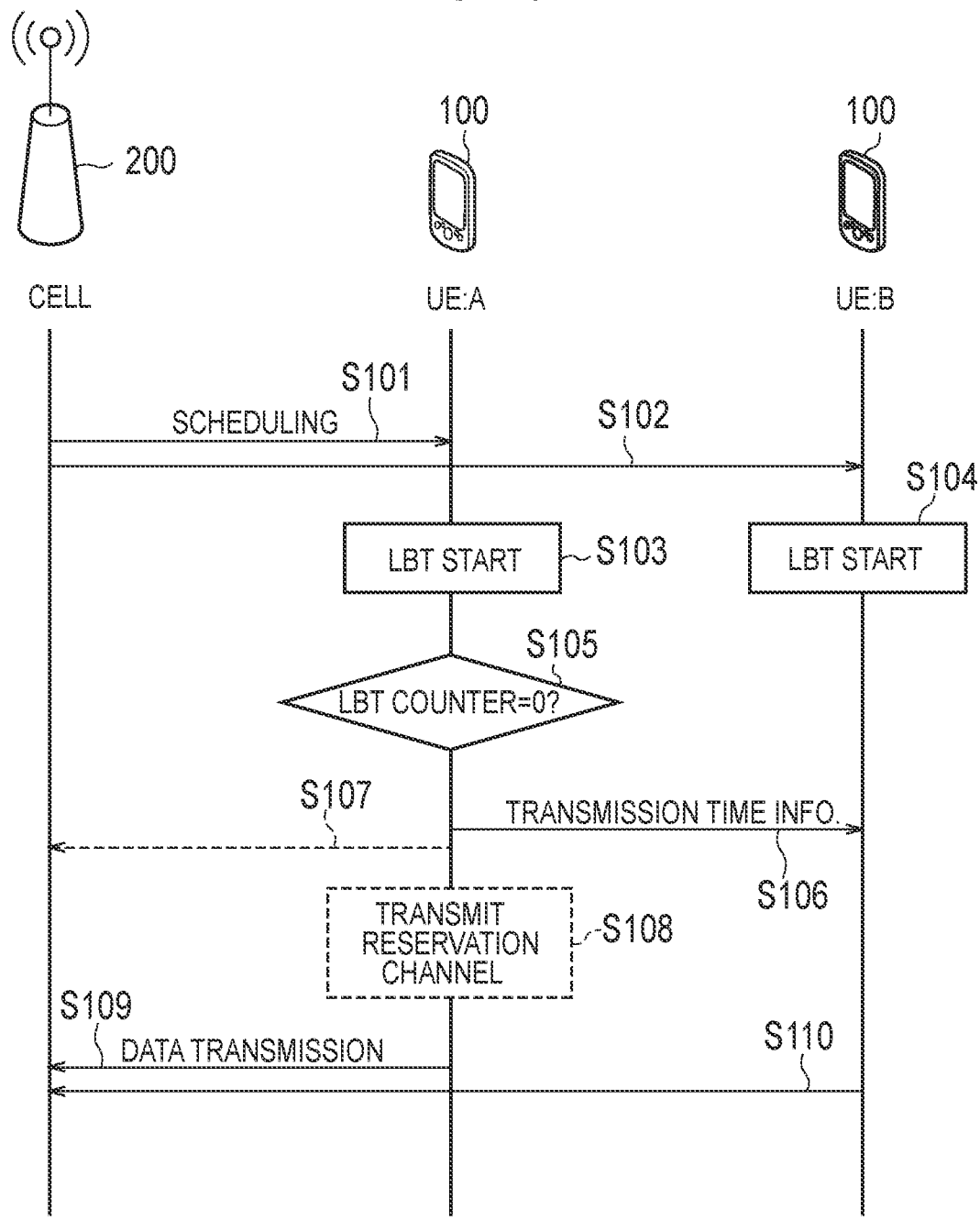
FIG. 16 is a sequence diagram illustrating an example of an operation according to the sixth embodiment.

FIG. 16 is a sequence diagram illustrating an example of an operation according to the sixth embodiment.

As illustrated in FIG. 16, in step S101, the eNB 200 performs uplink scheduling of the UE 100 (A), and transmits scheduling information to the UE 100 (A). In addition, in step S102, the eNB 200 performs uplink scheduling of the UE 100 (B), and transmits scheduling information to the UE 100 (B).

The scheduling information is transmitted by a SCell (i.e., cell in the unlicensed band) of the eNB 200. Alternatively, the scheduling information may be transmitted by a PCell (i.e., cell in the licensed band) of the eNB 200 by cross-carrier scheduling.

The eNB 200 may transmit, to the UE 100 (A), information (e.g., timer value) indicating a wait time from when the UE 100 (A) determines, by LBT, that uplink data transmission can be started, to when uplink data transmission is started. The wait time designates a time between steps S105 and S109, which will be described later. The information indicating the wait time may be transmitted by DCI together with scheduling information, or may be transmitted by RRC signaling.

The eNB 200 may manage the UE 100 (A) and the UE 100 (B) as UEs 100 belonging to the same group. In this case, the eNB 200 preferably group UEs 100 having similar radio environments (e.g., geographically-close UEs 100). The eNB 200 allocates the same identification information (group ID) to UEs 100 belonging to the same group.

In step S103, the UE 100 (A) starts a LBT procedure as illustrated in FIG. 5. In addition, in step S104, the UE 100 (B) starts a LBT procedure as illustrated in FIG. 5.

In step S105, the UE 100 (A) determines that uplink data transmission can be started, in response to a value of a counter of LBT becoming a predetermined value (more specifically, zero). Nevertheless, even if the value of the counter of LBT is not zero, in a situation in which the value is expected to be zero (e.g., counter value is one), the UE 100 (A) may determine that uplink data transmission can be started. In addition, at this time point, the UE 100 (B) has not determined yet that uplink data transmission can be started.

In step S106, the UE 100 (A) transmits, by broadcasting, a notice related to the start of uplink data transmission. The UE 100 (A) includes, in the notice, information indicating a start timing of uplink data transmission. The start timing of uplink data transmission may be defined according to a wait time designated by the eNB 200. The start timing of uplink data transmission may be represented by an absolute value such as a subframe number, or may be represented by a relative value such as "after arbitrary number of subframes". Hereinafter, such a notice will be referred to as "Transmission Time Info".

The transmission timing of "Transmission Time Info." needs not be at the subframe boundary. If the transmission timing is limited to the subframe boundary, waiting for the subframe boundary may cause another signal (Wi-Fi or another operator) to interrupt. Thus, if the UE 100 (A)

determines that uplink data transmission can be started, the UE 100 (A) may transmit "Transmission Time Info." in the middle of the subframe without waiting for the subframe boundary.

The "Transmission Time Info." may include a group ID of a group to which the UE 100 (A) belongs.

The "Transmission Time Info." is transmitted by a signal not requiring LBT (Short control information). Alternatively, the "Transmission Time Info." may be transmitted using sidelink of Device to Device (D2D).

The UE 100 (B) receives the "Transmission Time Info". Furthermore, the eNB 200 may receive the "Transmission Time Info." (step S107). The eNB 200 that has received the "Transmission Time Info." determines, based on the "Transmission Time Info.", a start timing of uplink data transmission in the UE 100 (A).

The UE 100 (B) that has received the "Transmission Time Info." completes LBT by the start timing of uplink data transmission that is indicated by the "Transmission Time Info".

In step S108, the UE 100 (A) may transmit a signal for reserving an uplink resource (Reservation signal). More specifically, the UE 100 (A) continuously transmits the "Reservation signal (Reservation channel) during a period up to step S109 so that another apparatus does not interrupt a frequency bandwidth in which LBT has succeeded. The "Reservation signal" may include information (identifier) for enabling the UE 100 (B) planning to perform transmission at the same timing, to remove the "Reservation signal".

In step S109, the UE 100 (A) starts uplink data transmission to the eNB 200 at the start timing of uplink data transmission. Here, it is assumed that the start timing of uplink data transmission is at the subframe boundary. In this case, for causing LBT of the UE 100 (B) to success, the UE 100 (A) does not transmit data at a point immediately before the subframe boundary that corresponds to the start timing of uplink data transmission, and performs transmission only at the subframe boundary.

In addition, in step S110, the UE 100 (B) starts uplink data transmission to the eNB 200 at the start timing of uplink data transmission, of which the UE 100 (A) has notified the UE 100 (B).

In this manner, according to this sequence, beginning at the UE 100 (A) that has succeeded in LBT the earliest, start timings of uplink data transmission in the UE 100 (A) and the UE 100 (B) can be synchronized.

Modified Example 1 of Sixth Embodiment

The eNB 200 may manage the number of uplink data transmissions for each group, and adjust a counter value (default value) of LBT for each group according to the number of uplink data transmissions. The counter value (default value) of LBT corresponds to "N" set in step S3 in FIG. 5. More specifically, by setting the counter value (default value) of LBT to become lower, for UEs 100 belonging to a group with a small number of transmissions, the eNB 200 increases transmission opportunitis of the UEs 100 belonging to a group with a small number of transmissions.

Modified Example 2 of Sixth Embodiment

The wait time from when it is determined, by LBT, that uplink data transmission can be started, to when uplink data transmission is started may be preset by system specifications. In this case, the "Transmission Time Info." may be a simple notice not including information indicating a start timing of uplink data transmission.

More specifically, the UE 100 (A) decides, as a start timing of uplink data transmission, a timing at which the preset wait time has elapsed from the transmission of "Transmission Time Info.", and starts uplink data transmission at the timing. The UE 100 (B) decides, as a start timing of uplink data transmission, a timing at which the preset wait time has elapsed from the reception of "Transmission Time Info.", and starts uplink data transmission at the timing.

In addition, the preset wait time may be a time short to such an extent that another apparatus does not interrupt. For example, the preset wait time may be a time corresponding to a Short Inter Frame Space (SIFS) used in a wireless LAN.

Other Embodiments

In the aforementioned embodiment, the description has been given of an example in which the same eNB 200 manages the cell #1 (licensed band) and the cell #2 (unlicensed band). Nevertheless, the present disclosure can be applied to a case in which different eNBs 200 manage the cell #1 (licensed band) and the cell #2 (unlicensed band).

In the aforementioned embodiments, the LTE system has been described as an example of a mobile communication system. Nevertheless, the present disclosure is not limited to the LTE system. The present disclosure may be applied to a system other than the LTE system.

[Additional Statement]

(1. Introduction)

In the last assembly, UL LAA has been discussed. In this additional statement, functions of UL LAA will be studied in more detail.

(2. Study of LBT for UL)

In the case of uplink, FBE is more suitable than LBE if a UE needs to execute LBT before UL transmission. For observing a principle of reusing an uplink access procedure of Rel-12, that is, a base station controls UL transmission by allocating uplink resources. In this case, if a UE transmits a reservation signal of an unallocated resource, before performing transmission on a granted uplink resource, permission cannot be obtained.

If LBE is applied to uplink transmission, unless a UE transmits an instruction for notifying a base station of a start time, an eNB does not recognize a start time of UL transmission in advance.

Furthermore, RANI needs to solve an issue as to whether it is beneficial to apply different schemes to DL and UL, that is, whether it is beneficial to apply LBE for DL, and FBE for UL. We propose that RANI should further study this issue.

Proposal 1: FBE LBT should be a baseline of uplink LAA.

Proposal 2: whether it is beneficial to have different schemes for DL and UL (i.e., to apply LBE for DL, and FBE for UL) should be researched.

(3. Issue of UL LBT)

Figure 17:
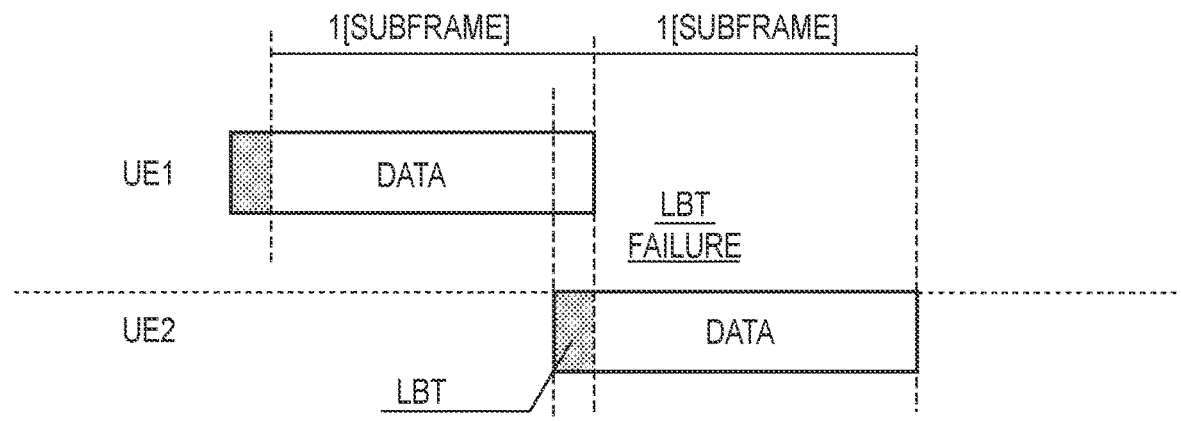
FIG. 17 is a diagram according to an additional statement of an embodiment.

In this section, an issue related to UL LBT will be studied. If an eNB allocates consecutive subframes for a plurality of UEs (UE 1 and UE 2), one of the UEs can experience an LBT failure as illustrated in FIG. 1. FIG. 17 is a diagram illustrating an example of consecutive transmission between two UEs.

Thus, an eNB should be able to transmit, to a UE 1, an indication indicating that the last symbol is omitted for adjusting consecutive transmission to a second UE 2. Because the necessity of omitting the last symbol dynamically changes, this indication should be included in uplink grant.

Proposal 3: an eNB should be able to transmit, to a UE, internet of omitting the transmission of the last symbol.

(4. Study of UL Transmission Start Time)

If FBE is applied to UL LAA, a UE needs not transmit an initial signal, as described in the discussion of DL LAA.

If LBE is applied to UL LAA, a UE needs to notify a serving eNB of the transmission start time. In the case of UL that is based on LBE, because multiplexing is performed in one subframe, there is complexity. Thus, each UE of a plurality of UEs needs to transmit an initial signal of itself. Because of these complexities, RAN1 needs to study these issues more carefully.

(5. Switching Between DL and UL)

This section focuses on switching between DL and UL for DL+UL LAA. In the case of switching from DL to UL, it is necessary to designate a special subframe (refer to an upper part in FIG. 18). The number of these special subframes should be made small.

Furthermore, an eNB needs to have flexibility of scheduling switching between DL and UL. This flexible switching from DL to UL can be immediately switched if an eNB has no data for transmission. Thus, this is an approach better than a TDD frame configuration of existing Rel-12. In the current TDD frame configuration, an eNB has to wait for switching regardless of whether the eNB has data to be transmitted.

Figure 18:
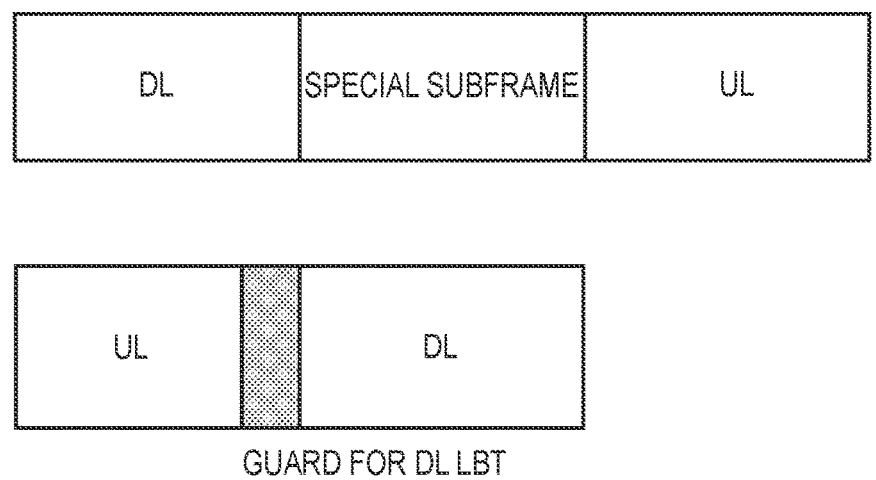
FIG. 18 is a diagram according to the additional statement of the embodiment.

FIG. 18 illustrates, as an example, an approach for switching from DL to UL, and switching from UL to DL. As illustrated in this diagram, in the case of switching from DL to UL, it is considered that RAN1 should consider providing a guard period for DL LBT at an end point of UL transmission.

Proposal 4: an NB needs to have flexibility of scheduling a chance of switching from DL to UL and a chance of switching from UL to DL. An eNB needs to have flexibility of scheduling a chance in switching DL, and DL in an UL switching chance and UL.

Proposal 5: RAN1 should consider providing a guard period for DL LBT at an end point of UL transmission.

The invention claimed is:

1. A base station for performing communication with a user terminal configured to transmit uplink data using an unlicensed band, the base station comprising:
    a controller configured to allocate to the user terminal a plurality of subframes as time resources for uplink transmission in the unlicensed band, in a case where the user terminal performs uplink data transmission according to a monitoring result of the unlicensed band; and
    a transmitter configured to transmit, to the user terminal, allocation information corresponding to a first subframe of the plurality of subframes, wherein
    the transmitter is configured to include, into the allocation information, first information indicating the first subframe and second information related to one or more subframes following the first subframe of the plurality of subframes, and
    the second information includes information indicating number of the plurality of subframes, information related to a resource block allocation in the plurality of subframes, and at least one of: information indicating modulation and coding scheme (MCS) in the plurality of subframes, and information indicating HARQ process ID in the plurality of subframes.

2. A user terminal, comprising:
    a receiver configured to receive allocation information from a base station, wherein the allocation information indicates a plurality of subframes as time resources for uplink transmission in an unlicensed band; and
    a transmitter configured to use at least one of the plurality of subframes to perform uplink data transmission according to a monitoring result of the unlicensed band, wherein
    the allocation information includes first information indicating a first subframe of the plurality of subframes and second information related to one or more subframes following the first subframe, and
    the second information includes information indicating number of the plurality of subframes, information related to a resource block allocation in the plurality of subframes, and at least one of: information indicating modulation and coding scheme (MCS) in the plurality of subframes, and information indicating HARQ process ID in the plurality of subframes.

3. A radio communication method, comprising:
    transmitting allocation information from a base station to a user terminal, wherein the allocation information indicates a plurality of subframes as time resources for uplink transmission in an unlicensed band;
    receiving the allocation information, at the user terminal; and
    using at least one of the plurality of subframes to perform uplink data transmission according to a monitoring result of the unlicensed band, wherein
    the allocation information includes first information indicating a first subframe of the plurality of subframes and second information related to one or more subframes following the first subframe, and
    the second information includes information indicating number of the plurality of subframes, information related to a resource block allocation in the plurality of subframes, and at least one of: information indicating modulation and coding scheme (MCS) in the plurality of subframes, and information indicating HARQ process ID in the plurality of subframes.

* * * * *